(12) United States Patent
Erhard et al.

(10) Patent No.: US 7,156,144 B2
(45) Date of Patent: Jan. 2, 2007

(54) SPRAY HEAD FOR A MOLD SPRAYING TOOL

(75) Inventors: Norbert Erhard, Lorch (DE); Hubert Pschenitschni, Winterbach (DE)

(73) Assignee: Oskar Frech GmbH +Co. KG, Schorndorf (DE)

( * ) Notice: Subject to any disclaimer, the term of this patent is extended or adjusted under 35 U.S.C. 154(b) by 35 days.

(21) Appl. No.: 10/825,621

(22) Filed: Apr. 16, 2004

(65) Prior Publication Data

US 2004/0222322 A1 Nov. 11, 2004

(30) Foreign Application Priority Data

Apr. 19, 2003 (EP) .................................. 03009079

(51) Int. Cl.
*B22D 27/00* (2006.01)
(52) U.S. Cl. ........................ 164/267; 164/72; 118/306; 239/548
(58) Field of Classification Search ................ 164/267, 164/72; 239/548; 118/306
See application file for complete search history.

(56) References Cited

U.S. PATENT DOCUMENTS

| 4,760,961 | A | 8/1988 | Nagai |
| 5,603,984 | A | 2/1997 | Keim et al. |
| 5,916,367 | A * | 6/1999 | Wollin ........................ 118/306 |
| 6,722,587 | B1 * | 4/2004 | Hanano ....................... 239/548 |
| 2002/0124895 | A1 | 9/2002 | Thiele et al. |

FOREIGN PATENT DOCUMENTS

| DE | 37 41 474 A1 | 6/1989 |
| DE | 3741474 | * 6/1989 |
| DE | 40 16 377 A1 | 12/1990 |
| DE | 4016377 | * 12/1990 |
| EP | 0 724 486 B1 | 7/1998 |

* cited by examiner

*Primary Examiner*—Kevin Kerns
*Assistant Examiner*—I.-H. Lin
(74) *Attorney, Agent, or Firm*—Crowell & Moring LLP

(57) ABSTRACT

A spray head for a spraying tool for spraying the halves of a casting tool is described, in which the connection is made to a traveling arm provided with the media-carrying passages through distributing blocks disposed one under the other, from which the connection is made to spray bars through cross connections. The new configuration is selected such that the connection of the spray bars can be made selectively to the one or other of the media passages. By arranging a plurality of distributing blocks together, the addition of spray bars can also be performed stack-wise at varying distances from the particular distributing block.

17 Claims, 4 Drawing Sheets

SPRAY HEAD FOR A MOLD SPRAYING TOOL

This application claims the priority of European Patent Application No. 03009079.9, filed Apr. 19, 2003, the disclosure of which is expressly incorporated by reference herein.

BACKGROUND AND SUMMARY OF THE INVENTION

The invention relates to a spray head for a mold spraying tool. The spray head includes a connecting piece which can be attached to a movable arm and has a plurality of through-passages each for the controlled feeding of the spray media, as well as with a connecting piece made up of connecting pieces extending out from the connecting piece across the direction of movement of the arm to connecting pieces leading to spray nozzles combined in spraying circuit groups and in communication through connecting passages to the through-passages in the connecting piece.

A spray head of this kind, which is of modular construction, is disclosed in U.S. Pat. No. 4,760,961. In it a spray head composed of variable vertical and horizontal columns has been created by a linear concatenation of a plurality of identical spray head modules, the arrangement of which lies substantially in a single plane. Any adaptation to the depth of the solid, confronting mold halves or of the movable mold halves, is not possible or possible only by the use of extension tubes for the nozzles. It is known that such extension tubes have a tendency when in constant operation to become offset from their position, so that certain disadvantages can occur in the spraying process.

EP 0 724 486 B1 discloses a spray head, wherein by the arrangement of spacing pieces the distance of spray plates from the movable arm in the direction of the mold halves can be variously configured. In addition to the adaptation of spray modules in plate form in planes running parallel between the mold halves, thus also the distance of the spray module arrangement perpendicular thereto, which is facing the fixed or movable mold, can be variously arranged. In this case too, however, the spray modules can be arranged largely arbitrarily only in their planes which run parallel to a central plane between the mold halves.

In all of the spraying tools known heretofore a plurality of spray circuits are provided, in which each of these spray circuits feeds any desired number of spray nozzles, which can be actuated independently of one another time-wise. The position of the spray circuits follows a pattern provided in the design phase. In the case of a spray tool having, for example, four spray circuits, the two odd spray circuits, i.e., spray circuit 1 and spray circuit 3 are facing the movable mold half and the spray circuits 2 and 4 spray the fixed mold half.

An object of the present invention is to construct a spray head of the kind named in the beginning such that both spray head sides, which thus are facing the fixed mold half in the one case and the movable mold half in the other, can be provided with spray nozzle arrays which lie in a plane running parallel to the center plane between the mold halves. Further, the spray circuits facing the individual mold halves can be made freely selectable.

To accomplish this object, provision is made in a spray head of the kind referred to in the beginning, such that the connection piece is constructed of a plurality of distributor blocks which can be placed one against the other in the direction of movement of the arm. Additionally, media-carrying passages branching transversely from all through-passages are arranged in a predetemined sequence and lead into both lateral surfaces. Further, connection plates which can be turned 180° can be placed on the lateral surfaces and are provided with at least one connecting passage which opens on the side adjoining the distribution block out of symmetry with the longitudinal central plane but in modular pattern of the mouths of the media-carrying passages. Moreover, on each connection plate the connecting pieces are connected up to the spray nozzles, so that each spray circuit group can be connected selectively to one of the through-passages and to the medium feed controlled therein.

With this configuration it becomes possible, for one thing, to associate only one spray circuit of four spray circuits, for example, with the fixed mold half, in order for example to spray certain mold parts successively or in groups or to blow them dry again with compressed air.

By dividing the connecting piece into several distributor blocks which are placed one under the other it becomes possible, by means of the connection plates which can be attached to the distributor blocks and possible elongations, to make the spacing of the spray nozzle groups from the distributor blocks different. As a result, the spray nozzle modules facing the movable mold halves will not be in a common plane running parallel to the central plane, but will be arranged sectionally under or over one another in planes that are at different distances from the moving arm and run from the associated distributor block placed on the arm. This configuration avoids the use of extension tubes and permits individual adaptation of the spray head modules to the mold halves plus the possibility of individually selecting the application of the spray.

In a further development of the invention, each connecting plate can be provided with two connecting passages which open asymmetrically from the longitudinal central plane. A flange block can be placed in front of the associated spray circuit group of spray nozzles, and used to select one of the two connecting passages as a supply passage for the spray circuit group.

In a still further development, connection blocks can be inserted optionally between the connecting plate and the flange block in order to adjust the spacing of the spray circuit groups. It therefore becomes possible to make all of the connection plates and flange blocks largely identical, and to achieve the spacing arrangement with junction blocks which also are of identical design. The parts necessary for the construction of the spray block therefore remain limited in number.

In an additional development, through-passages can be provided in each distributing block to carry drying air, and separate connection plates can be used for the connection of blast air nozzles. It thus becomes possible, as previously indicated, to blow-dry mold halves or even mold parts.

In a still additional development, the connecting blocks can be provided with through-holes which are symmetrical with a central longitudinal plane. The mouth connection of such symmetrical passages in the lateral surfaces thus becomes simple. In a development of the invention, each flange block can be provided with a connection passage which is arranged in the side adjacent the connecting block out of symmetry with a longitudinal center plane but spaced away from the through-bore in the connecting block. This configuration also permits the connection of a flange block in two positions 180E apart, so that in this manner a selection of a supply passage is possible.

In a yet additional embodiment of the invention, the spray nozzles that are combined to form a spray circuit group can be attached to a spray bar, which facilitates the assembly of the spray head. The spray bars can then be composed advantageously of a plurality of component units which are provided with media passages aligned with one another. Also the size of a spray bar can thus easily be built up individually.

The component units can then be provided with bent-away end portions, and the end portions can be formed by corner pieces which are attached to the end of straight units. This configuration then also makes it possible to construct the spray bars from spray bar parts set at an angle to one another, which further improves the possibility of adaptation to the mold halves.

In a still yet development of the invention it is possible that between a distributor block and a flange block one or more connecting pieces are provided for adjusting the distance of the spray circuit group from the central connecting piece. The previously mentioned adaptation of the spray circuit groups to the molds, which is possible by stacking them, can thereby be facilitated.

Other objects, advantages and novel features of the present invention will become apparent from the following detailed description of the invention when considered in conjunction with the accompanying drawings.

DETAILED DESCRIPTION OF THE DRAWINGS

Figure 1:
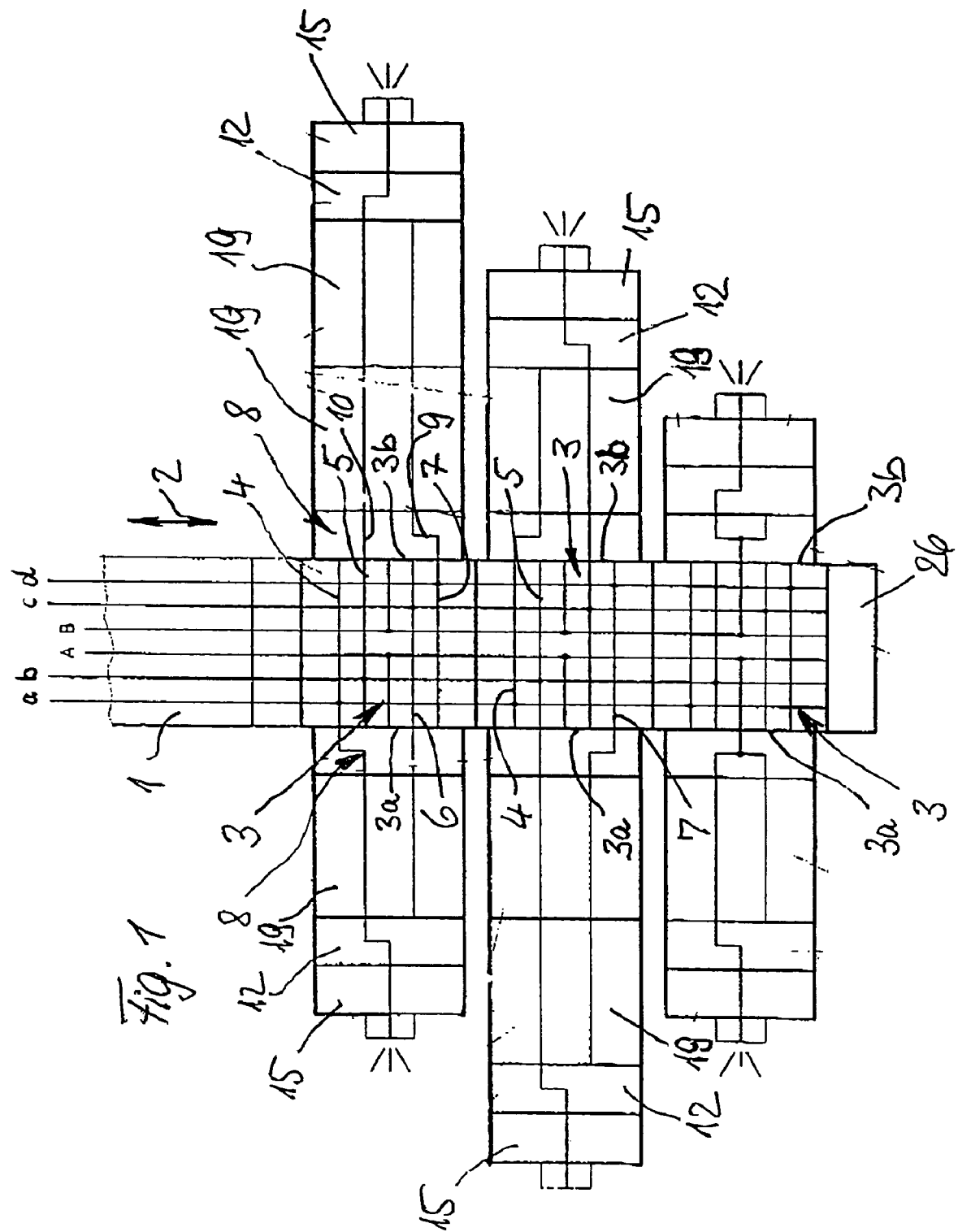
FIG. 1 is a schematic drawing of the structure of a spray head according to the invention.

FIG. 1 shows schematically the structure of a spray head according to the invention. An arm 1, guided for movement in the direction of arrow 2, is provided at its lower end with a plurality of distributor blocks 3 which are all of identical construction and are arranged flush with one another in the direction of movement 2 of the arm. All of the distributor blocks 3 are close together and close to the connecting end of arm 1.

The arm 1, which is connected in a known manner with a controlled drive, has in its interior the passages a, b, c, d and A and B shown diagrammatically side by side. The passages a to d are each fed with parting agent and compressed air controlled from the outside. The passages A and B are fed exclusively with compressed air which is to be used as blasting air for drying the molds.

Each of the distributor blocks 3 has an appropriate number of passages which are associated with the passages a to d and A and B of the arm 1. In a known manner, the distributor blocks 3 are for this purpose tightly connected to one another at their connecting faces and the uppermost distributor block lies closely against the bottom end of the arm 1.

Figure 3:
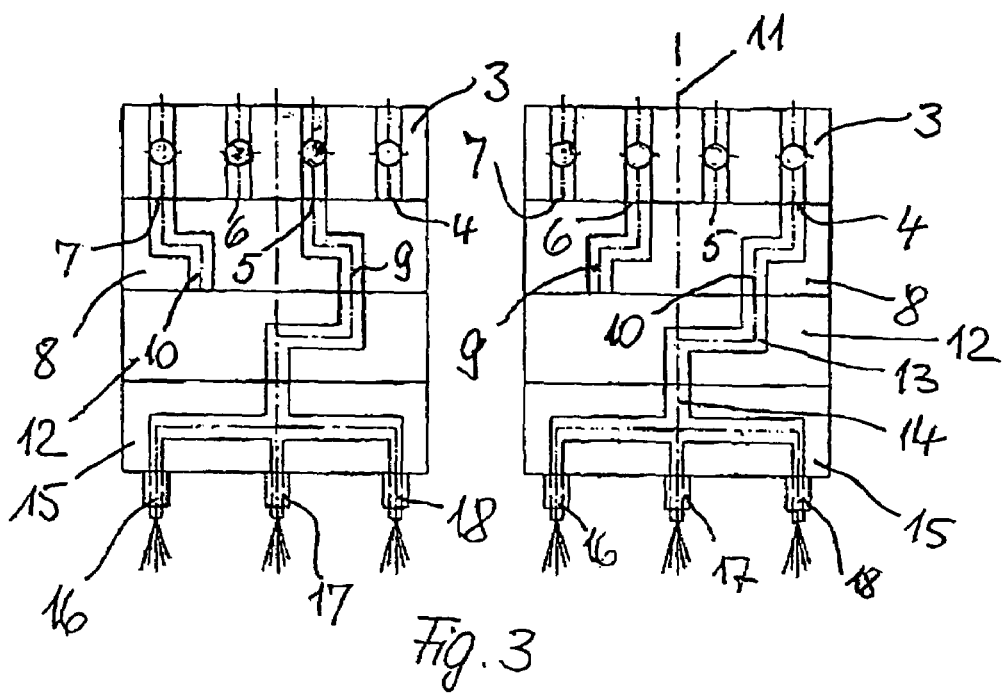
FIG. 3 shows the diagrammatic representation of a section through a portion of the spray head of FIG. 2 along the plane III.
Figure 4:
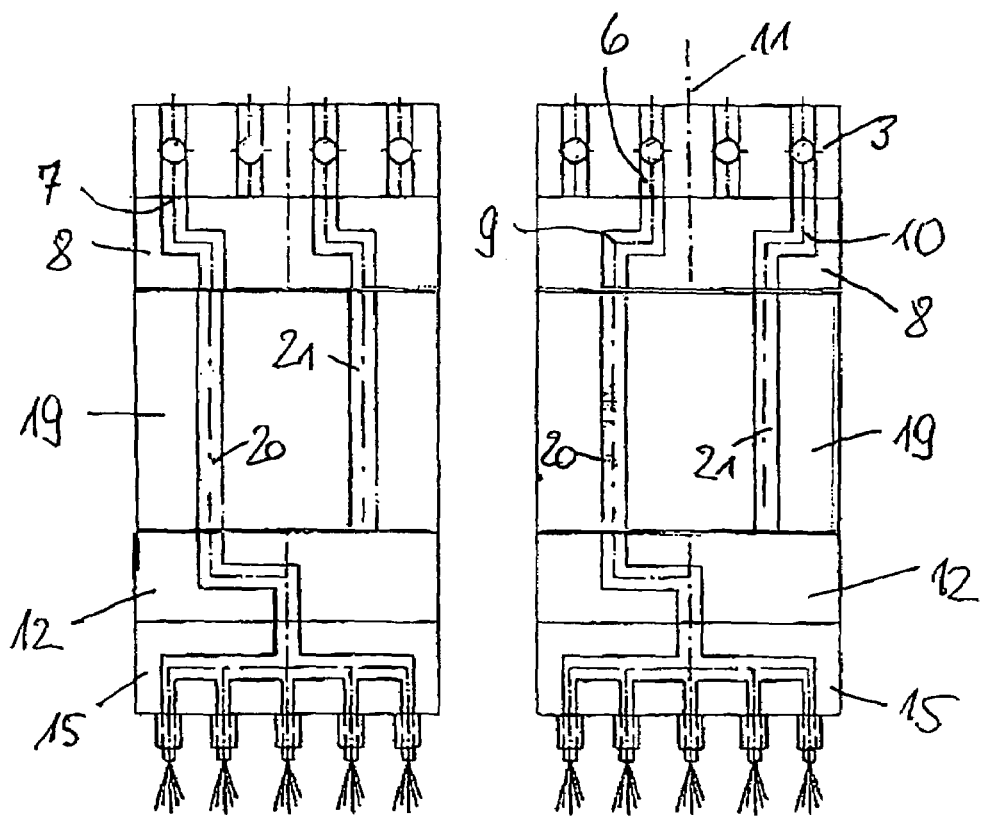
FIG. 4 is similar to FIG. 3, but in a variant of a spray head arrangement.

From the passages in the distributor blocks 3, which are provided with the same reference numbers as those for the passages of the arm 1, the media ducts 4, 5, 6 and 7 branch laterally and lead into the openings, designated by the same reference numerals, in the side walls 3a and 3b of each distributor block. On these lateral surfaces 3a and 3b of each distributor block 3, connecting plates 8 are attached, which in the illustrated embodiment are each provided with two connecting passages 9 and 10 which, as especially seen in FIGS. 3 and 4, are asymmetrical to a central longitudinal plane 11 running through the distributor block 3 and the connecting plate 8. As shown in FIG. 3 or FIG. 4, the mouth of the passage 9 or 10 is always connected to the mouths 4, 5, 6 and 7 of the passages. In FIG. 3, the connecting plates 8 therefore permit at least one of the connecting passages 9 or 10 to connect to one of the media passages 4 to 7. As FIG. 3 shows, the connection plate 8 can be placed 180° on the distributor block 3, so that on the one hand the connecting passage 9 comes in contact with the media passage 5 and the connecting passage 10 with the media passage 6 and the connecting passage 10 with the media passage 4, the connecting plates 8 being all of the same configuration.

According to FIG. 3, a flange block 12 can be connected to a connection plate 8 and is provided in turn with a connecting passage 13 which opens on the side lying against the connection plate 8 outside of the central longitudinal plane 11, but such that it comes to cover the mouths of the passage 9 or 10. On the opposite side, the connecting passage 13 leads into the central longitudinal plane 11 and overlaps a central connection 14 of a spray bar 15 which can be provided with spray nozzles 16, 17 and 18. The two drawings placed side by side in FIG. 3 make it clear that, depending on the position of the connection plate 8, these spray nozzles 16, 17 and 18 can be brought into connection with the media passage 4 or with the media passage 5. This means that, whenever the odd-number media passages 5 and 7 are differently supplied with parting agent and compressed air than the straight media passages 4 and 6, the spray nozzles 16, 17 and 18 are connected to a different spray circuit. By selecting the position of the connecting plates 8 it therefore is possible in a simple manner to connect spray bars 15 and their spray nozzles selectively to the one or the other spray circuit, so that the moment that the spray occurs can also be set.

Figure 2:
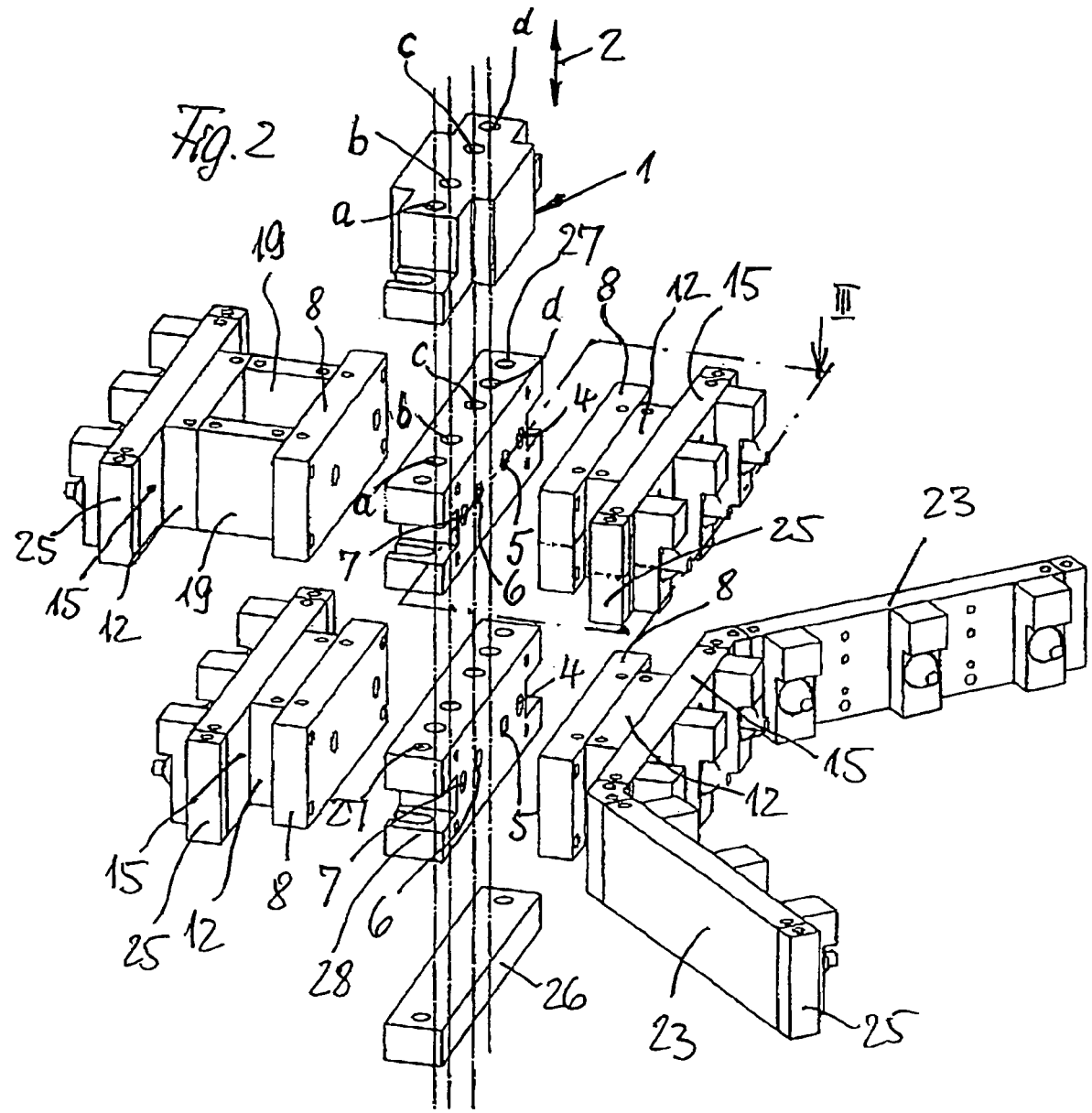
FIG. 2 is an exploded view of an embodiment of a spray head constructed according to the invention.

FIG. 1 shows diagrammatically that the flange blocks 12 do not have to be connected directly to the connection plates 8 as shown in FIG. 3. Instead, it is possible, as also shown in FIG. 2 and in FIG. 4, to connect the flange blocks 12 through connecting blocks 19 to the connection plates 8, while connecting passages 20, 21 run in the connecting blocks 19 and are so attached that they are parallel and in mirror-image symmetry with the central plane 11. Through at least one of these passages—through the connecting passage 20 in the embodiment according to FIG. 4—the connection to the media passage 7 or to the media passage 6 is made. FIG. 1 shows that several connecting pieces 19 can be inserted between connection plate 8 and flange block 12, so that thus the distance of the spray bars 15 from the associated distribution block 3 can be made more or less great. FIG. 2—also FIG. 1 schematically—thus make it clear that thus spray block arrangements can be achieved in a multilevel manner in the planes running perpendicular to the direction of movement 2 which pass through the distribution blocks 3, which do not lie in a plane running parallel to the direction of movement 2, but are at different heights from the middle of the support arm 1 and distribution blocks 3.

Figure 5:
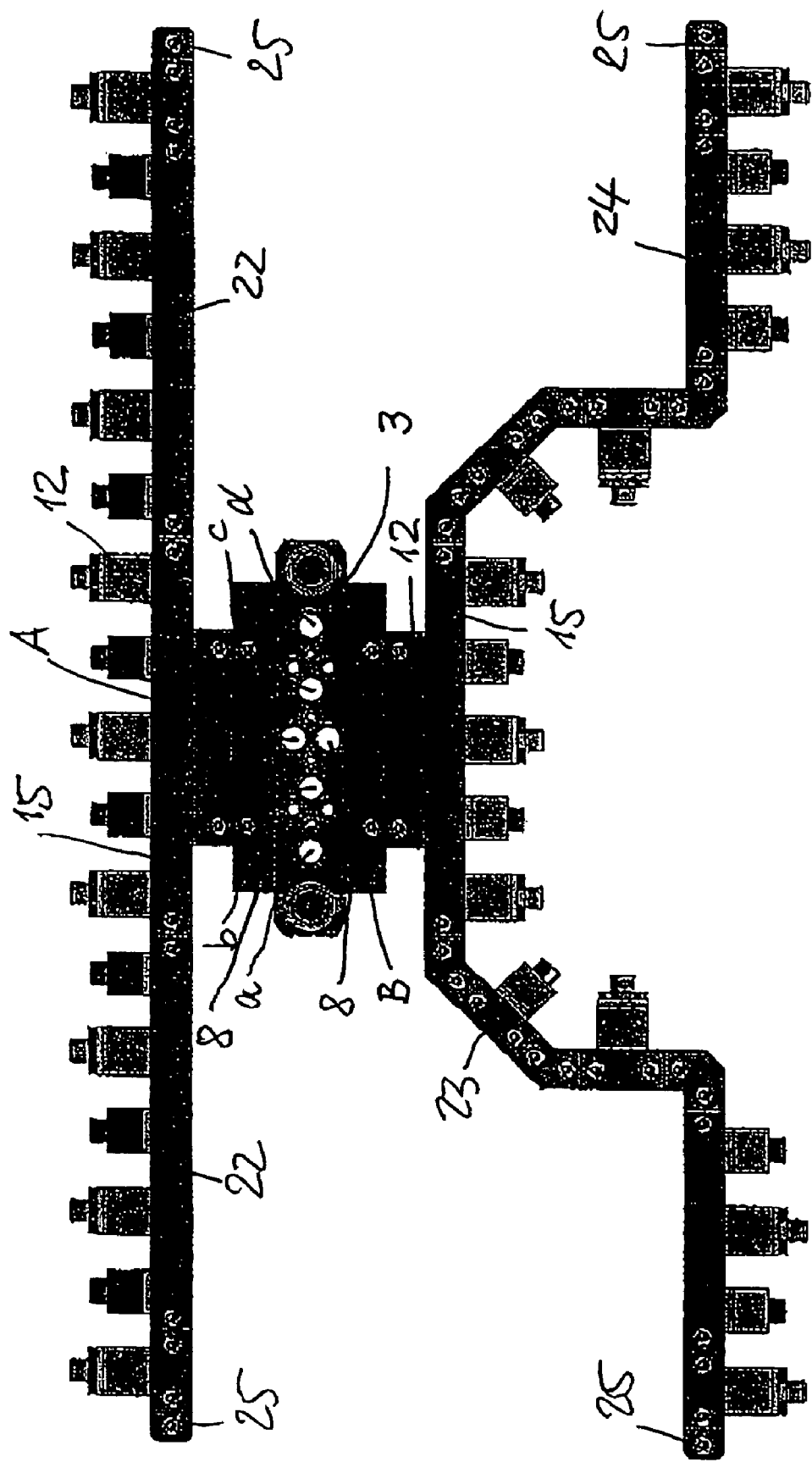
FIG. 5 is the representation of an arrangement of spray nozzles differing from the spray nozzle arrangement of FIG. 2 on one of the distributor blocks situated one under the other.

Lastly, FIG. 5 shows that it is also possible to attach upright spray bars 23 at each of the ends of the spray bars 15 at an angle to the spray bar 15, which can also be extended by corresponding corner pieces to form spray bars 24. Also the prolongation of a spray bar 15 is possible at both its extremities by spray bars 22 which can be the same in their construction as the spray bars 15. All of the spray bars 15, 22 or 24 are to be terminated externally by end pieces 25. This also applies to the passages a, b, c and d, which are to be closed at the bottom-most distributor block 3 with an end piece 26. As it appears suggestively in FIG. 2, the distributor blocks 3 are held together by threaded bolts which are passed through openings 27 or through flange parts 28 to the terminal bar 26.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A spray head for a mold spraying tool, comprising:
a plurality of distributor blocks connected to a moveable arm and placed against one another in the direction of movement of the arm, each of the distributor blocks including a plurality of through-passages for controlled feeding of spray media, and media passages branching from the through-passages in a direction transverse to the direction of movement of the arm, the media passages opening into both lateral surfaces of the distributor blocks;
connecting plates connected adjacent to the lateral surfaces of the respective distributor blocks, each connecting plate being turnable about a longitudinal central plane between a first position and a second position, in which the connecting plate is turned 180° about the longitudinal central plane with respect to the first portion, so that in each of the first and second positions, the connecting plate has a connecting passage in fluid connection with a corresponding one of the media passages of the distributor blocks, the connecting passage being asymmetric to the longitudinal central plane in each of said first and second positions; and
connecting pieces extending in the direction transverse to the direction of movement of the arm;
wherein the connecting pieces are combined together in spray circuit groups and have connecting passages that are in communication with the through-passages of the distributor blocks;
wherein the connecting pieces are connected up to the connecting plates; and
wherein the connecting pieces are connected to spray nozzles so that each spray circuit group can be connected selectively to one of the through-passages.

2. The spray head according to claim 1, wherein each connection plate is provided with two connecting passages which open asymmetrically to the longitudinal central plane, and wherein a flange block is attached in front of the associated spray circuit group of spray nozzles, by which one of the two connecting passages is selected as a passage for supplying the spray circuit group.

3. The spray head according to claim 2, wherein, between the connection plate and the flange block, connecting blocks are optionally inserted.

4. The spray head according to claim 3, wherein the connecting blocks are provided with through-bores which are symmetrical with a central longitudinal plane.

5. The spray head according to claim 1, wherein, in each distributor block, through-passages are provided for carrying drying air, and wherein separate connecting plates are provided for connecting blast air nozzles.

6. The spray head according to claim 1, wherein each distributor block includes through-passages for carrying drying air, and wherein some of the separate connecting plates are provided for connecting blast air nozzles.

7. The spray head according to claim 1, wherein the spray nozzles combined in at least one of the spray circuit group are attached to a spray bar.

8. The spray head according to claim 7, wherein each spray bar is combined with other spray bars, each piece being provided with media passages which align with the media passages in the adjacent piece.

9. Spray head according to claim 8, wherein pieces are provided with angled end portions.

10. Spray head according to claim 9, wherein the angled end portions are formed by corner pieces which are attached to the end of straight portions.

11. The spray head according to claim 1, wherein the connecting pieces each include two connecting passages which open asymmetrically to the longitudinal central plane, and wherein one of the two connecting passages is selected as a passage for supplying the spray nozzles.

12. The spray head according to claim 11, further comprising connecting blocks that are disposed between the connection plate and the connecting pieces in order to adjust the distance between the spray circuit groups and the distributing block.

13. The spray head according to claim 12, wherein the connecting blocks each have through-bores which are symmetrical with respect to the central longitudinal plane.

14. The spray head according to claim 1, further comprising a spray bar, wherein the spray nozzles in one of the spray circuit groups are attached to the spray bar.

15. The spray head according to claim 14, further comprising an additional spray bar, wherein the spray bars are combined, the media passages of one of the bars being aligned with the media passages of the other.

16. The spray head according to claim 15, further comprising a connecting piece having angled ends.

17. A method of making a spray head for a mold spraying tool, comprising:
connecting a plurality of distributor blocks to a moveable arm and placing the distributor blocks against one another in the direction of movement of the arm, the distributor blocks including a plurality of through-passages for controlled feeding of spray media, and media passages branching from the through-passages in a direction transverse to the direction of movement of the arm, the media passages opening into both lateral surfaces of the distributor blocks;
connecting a plurality of connecting plates adjacent to the lateral surfaces of the distributor blocks, each connecting plate being turnable about a longitudinal central plane between a first position and a second position, in which the connecting plate is turned 180° about the longitudinal central plane with respect to the first portion, so that in each of the first and second positions, the connecting plate has a connecting passage in fluid connection with a corresponding one of the media passages of the distributor blocks, the connecting passage being asymmetric to the longitudinal central plane in each of said first and second positions; and
arranging a plurality of connecting pieces so that they extend in the direction transverse to the direction of movement of the arm, so that the connecting pieces are combined together in spray circuit groups and have connecting passages that are in communication with the through-passages of the distributor blocks, so that the connecting pieces are connected to the connection plates, and so that the connecting pieces are connected to spray nozzles so that each spray circuit group can be connected selectively to one of the through-passages.

* * * * *